(12) United States Patent
Moore et al.

(10) Patent No.: US 10,485,260 B2
(45) Date of Patent: Nov. 26, 2019

(54) QUICK-COOK GRAINS AND PULSES

(71) Applicant: The Quker Oats Company, Chicago, IL (US)

(72) Inventors: Gary Moore, Chicago, IL (US); Waleed Yacu, Chicago, IL (US)

(73) Assignee: THE QUAKER OATS COMPANY, Chicago, IL (US)

(*) Notice: Subject to any disclaimer, the term of this patent is extended or adjusted under 35 U.S.C. 154(b) by 168 days.

(21) Appl. No.: 14/883,260

(22) Filed: Oct. 14, 2015

(65) Prior Publication Data

US 2016/0029672 A1  Feb. 4, 2016

Related U.S. Application Data

(62) Division of application No. 13/303,378, filed on Nov. 23, 2011, now Pat. No. 9,161,559.

(60) Provisional application No. 61/416,468, filed on Nov. 23, 2010.

(51) Int. Cl.
| | | |
|---|---|---|
| A23L 11/00 | (2016.01) |
| A23P 30/30 | (2016.01) |
| A23P 30/32 | (2016.01) |
| A23L 7/178 | (2016.01) |
| A23L 7/183 | (2016.01) |
| A23L 7/196 | (2016.01) |
| A23L 11/10 | (2016.01) |

(52) U.S. Cl.
CPC .............. *A23P 30/32* (2016.08); *A23L 7/178* (2016.08); *A23L 7/183* (2016.08); *A23L 7/196* (2016.08); *A23L 11/10* (2016.08); *A23V 2002/00* (2013.01)

(58) Field of Classification Search
USPC .......................................... 426/634
See application file for complete search history.

(56) References Cited

U.S. PATENT DOCUMENTS

| | | | |
|---|---|---|---|
| 3,753,727 A | | 8/1973 | Whelan |
| 5,066,506 A | * | 11/1991 | Creighton ................ A23B 9/02 426/450 |
| 5,183,678 A | * | 2/1993 | Taga ....................... A23L 11/05 426/448 |
| 2002/0172753 A1 | * | 11/2002 | Ehlers .................... A23K 40/20 426/623 |
| 2006/0153965 A1 | * | 7/2006 | Borders ................... A23L 11/01 426/634 |
| 2010/0104720 A1 | * | 4/2010 | Dierking ................. A23P 30/20 426/508 |
| 2010/0285196 A1 | * | 11/2010 | Moore .................... A23P 30/36 426/534 |

* cited by examiner

*Primary Examiner* — Lien T Tran
(74) *Attorney, Agent, or Firm* — James R. Gourley; Samie S. Leigh; Carstens & Cahoon, LLP

(57) ABSTRACT

A method for making a quick-cook grain or pulse via flat plate compression or gun puffing by controlling the porosity of the grain or pulse. Further, the grain or pulse made in accordance with this invention retains the texture, flavor and appearance of the original grain or pulse.

10 Claims, 10 Drawing Sheets

QUICK-COOK GRAINS AND PULSES

This application claims priority to U.S. Provisional Application No. 61/416,468, filed on Nov. 23, 2010, which is incorporated herein in its entirety.

This application is a divisional of application Ser. No. 13/303,378 filed on Nov. 23, 2011, now U.S. Pat. No. 9,161,559

FIELD OF THE INVENTION

The present invention relates generally to a method of processing grains and pulses to control their porosity while retaining their original identity.

BACKGROUND OF THE INVENTION

Whole grains play an important role in a healthy and balanced diet. Consumption of whole grains provide many health benefits including lowering the risk of chronic diseases such as diabetes and heart disease. Whole grains have also been found to promote weight management and may protect against cancer.

Pulses also play an important role in a healthy and balanced diet. Because of their high protein content, pulses such as kidney beans and lentils are sometimes used as meat substitutes and are heavily consumed by vegetarians and vegans for this reason. Pulses are also low in fat, high in dietary fiber, and rich in antioxidants.

Although grains and pulses provide many health benefits, they are not consumed as frequently as they should be by the average American due to the substantial preparation time needed to cook these foods. In general, a whole grain with its bran layer intact and no modifications made to its structure will cook on the stovetop in about 35 to 45 minutes. Mature pulses must be soaked and then cooked thoroughly before they can be eaten, which can be very time consuming (from one hour to overnight preparation).

Although attempts have been made to provide the consumer with a quick-cooking grain or pulse, these attempts are either expensive to commercially produce due to efficiency or result in a product that is overly puffed, thereby compromising the original texture, flavor and appearance of the original grain and resulting in consumer skepticism. Further, the current technologies that are used to make quick-cooking grains and pulses have many disadvantages. For instance, most of these technologies require pre-cooking with a large amount of water and then removing the water at great expense and poor efficiencies. Another method involves pre-hydrating in the case of grains and pulses to a high moisture and then freeze drying to remove moisture while retaining a porous, reduced density whole particle. Once again, this process is expensive and inefficient when performed on a commercial scale. Additionally, grains can be pre-cooked in an extruder and subsequently formed into grain-like shapes, but these methods change the appearance of the grain and leave it looking unnatural.

In light of the foregoing, a need exists in the field for efficient methods for efficiently and cost-effectively making quick-cooking whole grains and pulses wherein the identity of the caryopsis does not change significantly during processing. Therefore, not only the taste, but also the appearance of the caryopsis is acceptable to the consumer.

The processing methods described and claimed herein create stable, porous, dry whole kernel products without the need for hydrating to 60-80% moisture and then removing the moisture back down to a stable moisture content. This invention also provides a controlled level of puffing for whole grains or whole pulses. Current gun puffed grains are highly puffed and lose their original identity when cooked or soaked in water. They also have a Styrofoam texture in a dry state. With a reduced level of puffing the whole grains and pulses retain their identity when cooked and have a more robust texture when eaten in their dry state. This technology also enables infusion of liquids into the grain or legume structure.

BRIEF SUMMARY OF THE INVENTION

The present invention relates generally to a method of preparing quick-cooking grains and pulses by controlling their porosity using flat plate compression or gun puffing.

DETAILED DESCRIPTION OF THE DRAWINGS

DETAILED DESCRIPTION OF THE INVENTION

The present invention relates to a method of processing whole grains or pulses to manipulate the internal structure of the food thereby increasing porosity while retaining the nature appearance/original identity of the grains or pulses.

The grains used in accordance with the present invention may include: cereals such as corn, wheat, rice, oat, barley, sorghum, millet, rye, triticale, and spelt, and pseudocereals such as buckwheat and quinoa, and mixtures of these grains. Likewise, the pulses used in accordance with the present invention may include: beans such as pinto, navy, kidney, lima azuki, mung and black gram, dry peas such as garden and protein and chickpea, cowpea, pigeon pea, black-eyed pea and lentils and mixtures of these pulses.

Unpuffed grains and pulses have a bulk density of approximately 800 grams/liter. Bulk density is a secondary indicator of grain porosity, showing that the grains or pulses have swollen without gaining weight. The invention described herein controls the porosity of the grains and pulses and reduces the bulk density to an optimal level for increased hydration while maintaining the texture and appearance of the original grains and pulses.

"Original identity," "original state" or "raw" as used herein means the uncooked grains or pulses. "Instantaneously" as used herein means a time frame of two seconds or less.

The inventors found that manipulating gun puffing and flat-plate compression processes (as more fully described below) produced lightly puffed grains or pulses with novel properties, including increased moisture penetration rate, decreased preparation time, and a natural appearance following cooking. For example, the grains and pulses made in accordance with the present invention cook in about 1-15 minutes versus the 35 minutes to potentially hours (between soaking and boiling) for grains and pulses in their original/raw states.

Figure 3:
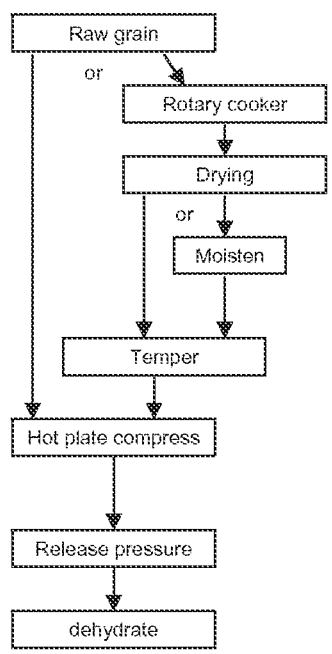
FIG. 3 is a processing schematic depicting one aspect of the instant invention relating to hot plate puffing to produce quick cook cereal grains.
Figure 4:
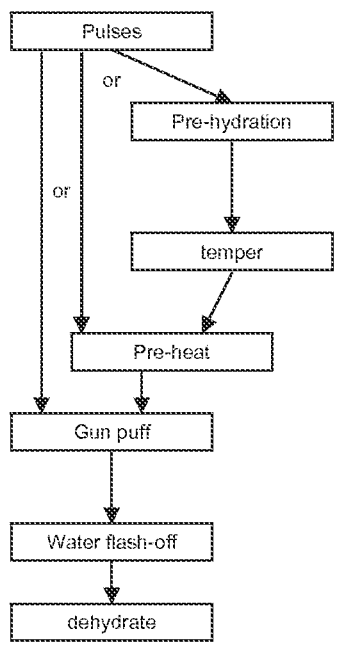
FIG. 4 is a processing schematic depicting one aspect fo the instant invention relating to hot plate puffing to produce quick cook pulses.

One aspect of the present invention, illustrated in FIGS. 3 and 4 includes preparing quick-cooking grains and pulses with controlled porosity using hot plates. In this method, raw grain or pulse, having a moisture content of about 8-18% (wet basis,) in the form of whole kernels of grains or pulses are introduced between flat plates, compressed and heated. Prior to hot plate compression, hulls are removed from any grains containing intact hulls. The kernels are compressed for about 1-5 seconds using flat plates heated to about 150-250° C. to partially or fully gelatinize the starch. For slightly puffed products (e.g., bulk density reduction of 5-35%), only partial gelatinization is required. This can be advantageous for achieving certain types of texture. For moderate to highly puffed products (e.g. bulk density reduction of 50-75%), more complete gelatinization of the starch is required to provide structural integrity. Following compression, the pressure is reduced to atmospheric pressure almost instantaneously, for example, less than about 2 seconds. After the pressure is released, the kernels are discharged from the plates. This rapid pressure release causes the internal volume of the grain or pulse kernel to increase due to the controlled pressure and temperature differential. Moreover, the moderate moisture flash-off and light/subtle puffing leave the kernels with a reduced bulk density. For example, the bulk density of the lightly puffed grains may range from about 260-700 g/L, such as about 350-450 g/L. Further, the final moisture of the grains is less than about 14% (wet basis), such as about 7-11%. In an alternative aspect of the invention, the puffed kernels may be further dehydrated by any applicable means, such as drying with hot air in a batch or continuous bed dryer or dried in a fluid bed hot air dryer until a final moisture of less than 14% and $a_w$ less than 0.65 is achieved. Equipment that may be used to compress the kernels under pressure and heat include a rice cake popping machine, wherein the plates operate within a mold. The pressure in the hot plates during compression may be between 500-1000 psi. Alternatively, a pair of heated rolls, such as a pair of cereal flaking rolls, rotating towards each other may be used to compress and heat the kernels to lightly puff the kernels.

In another aspect of the present invention, the raw grains are mixed with ingredients, including, but not limited to water, flavor, nutrients and antioxidants to create a grain mixture. This grain mixture is then cooked under pressure, such as in a rotary cereal cooker in an atmosphere of steam pressure at 15-35 psig (250-285° F.) for a period of 20-90 minutes to partially or fully gelatinize the starch and arrive at a cooked grain mixture with a final moisture content of about 20-50%. Next, the cooked grain mixture is dried to about 11-13% moisture if being stored or about 12-18% if being immediately puffed. A moderate temperature, such as about 82° C. for about 60 minutes, may be used to dry the cooked grain mixture. This dried cooked grain mixture is subsequently rehydrated, using water or steam, to about 12-18% moisture. Following this rehydration step, the grain is tempered to allow moisture to equilibrate throughout the internal structure of the grain. Following tempering, the grain is then introduced between flat plates, compressed and heated as described in more detail above. The grain has a similar identity to the pre-processed grain. It still looks like a kernel of oat, rice, etc. but it is in a somewhat flattened state. Upon cooking in water by the end user, the kernels absorb water and return to a more rounded shape. It therefore looks very similar to a non-flat plate kernel that has been cooked in water to the same final moisture state. "Bumping" is a process step that has been used for quick rice for a long time. This is typically done sometime during the quick rice manufacturing process by putting cooked rice through a pair of rolls to make the rice kernel thinner. A thinner kernel cooks faster. In aspects of the invention set for the herein, there is a benefit of faster cooking due to a puffed internal structure and a flatter kernel.

Figure 1:
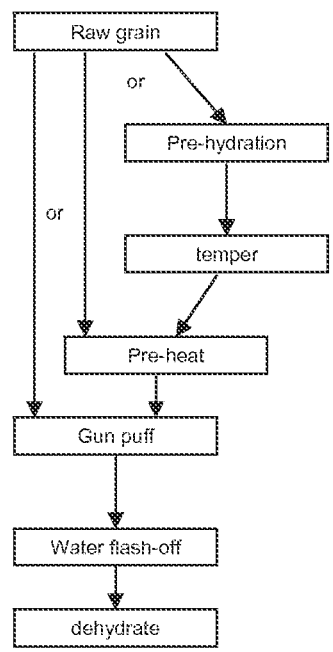
FIG. 1 is a processing schematic depicting one aspect of the instant invention relating to gun puffing to produce quick cook cereal grains.
Figure 2:
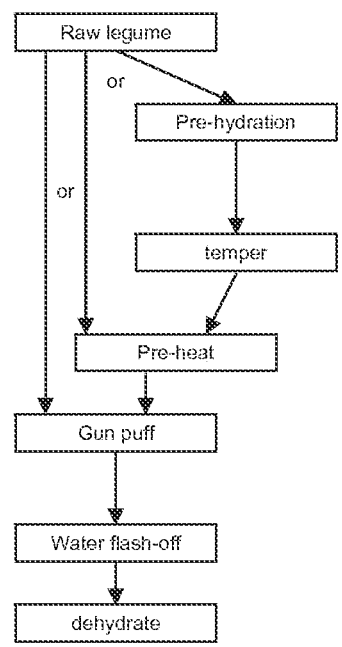
FIG. 2 is a processing schematic depicting one aspect of the instant invention relating to gun puffing to produce quick cook pulses.

In yet another aspect of the present invention, and as illustrated in FIG. 1, de-hulled whole kernel grains having a moisture content of about 8-14% (wet basis) are introduced into a gun puffing chamber. The chamber is then sealed and the pressure within the chamber is raised to about 80-175 psig at a temperature of about 162-192° C. until the moisture content of the grains reaches about 14-30% (wet basis). This type of puffing usually takes about 60-120 seconds to complete. This temperature and pressure increase within the puffing chamber is raised by injection of saturated steam or superheated steam. The pressure is then reduced to atmospheric pressure almost instantaneously (less than about 2 seconds). The grain is exposed to the rapid change in pressure, either by rapidly opening a lid or a valve at the discharge of the puffing gun, or by passing the grain kernels and steam through a venturi nozzle to create the rapid pressure reduction. Next, the kernels are dehydrated by any applicable means, such as drying with hot air in a batch or continuous bed dryer or dried in a fluid bed hot air dryer to reach a final moisture below about 14% (wet basis) and an $a_w$ of less than 0.65. For quick-cook porridge or side dishes, the final moisture content of the grains is about 10-13% (wet basis), whereas grains used as inclusions have a final moisture content of about 3-6% (wet basis).

Alternatively, the raw grains may be preheated to increase the temperature from about 38° C. to about 90° C. prior to introducing the pre-heated grains into the puffing chamber as described in more detail above.

A further aspect of the present invention includes pre-hydrating and tempering the raw grains prior to pre-heating and subsequently gun puffing. For example, the grains may be combined with water via mixing, spraying, steaming or humidifying, to bring the moisture content to about 13-25% wet basis thereby forming a hydrated grains. This pre-hydration step could also be used to introduce other ingredients to the raw grains, including, but not limited to water, flavor, nutrients and antioxidants to create a grain mixture. The hydrated grains are tempered for a period of time sufficient to allow the water to penetrate into the center, or near the center, of the grains for a period of about 1-12 hours. The grains are then pre-heated to increase the temperature from about 38° C. to about 90° C. before introducing the pre-heated grains into the puffing chamber as set forth in more detail above. However, in another aspect of this invention, the grains are puffed without using the pre-heating step.

A further aspect of the present invention includes a method for processing quick-cook pulses. In accordance with this embodiment, dry, whole or split pulses with a moisture content of about 11-15% (wet basis) are introduced into a gun puffing chamber. The chamber is then sealed and the pressure within the chamber is raised to about 80-175 psig at a temperature of about 162-192° C. until the moisture content of the pulses reaches about 14-30% (wet basis), which may take about 60-120 seconds. This temperature and pressure increase within the puffing chamber is raised by injection of saturated steam or superheated steam, or externally heated to reach target super-atmospheric pressure. The pressure is then reduced to atmospheric pressure almost instantaneously. Next, the pulses are dehydrated by any applicable means, such as drying with hot air in a batch or continuous bed dryer or dried in a fluid bed hot air dryer to reach a final moisture below about 14% (wet basis) and an $a_w$ of less than 0.65. Quick-cook pulses made in accordance with the present invention and used in meals or side dishes typically have a final moisture content of about 10-13% (wet basis).

Alternatively, the dry, whole or split pulses may be preheated to increase the temperature from about 38° C. to about 90° C. before introducing the pre-heated pulses into the puffing chamber as described in more detail above.

A further aspect of the present invention includes pre-hydrating and tempering the dry, whole or split pulses prior to pre-heating (as described in the immediately preceding paragraph) and subsequently gun puffing. For example, the pulses may be combined with water via mixing, spraying, steaming or humidifying, to bring the moisture content to about 13-25% wet basis thereby forming a hydrated pulses. This pre-hydration step could also be used to introduce other ingredients to the raw pulses, including, but not limited to water, flavor, nutrients and antioxidants to create a legume mixture. These hydrated pulses are tempered for a period of time sufficient to allow the water to penetrate into the center, or near the center, of the grain, typically 1-12 hours. The pulses are then pre-heated to increase the temperature from about 38° C. to about 120° C. before introducing the pre-heated grains into the puffing chamber as set forth in more detail above. In an alternative aspect of the present invention it is possible to lightly puff the pre-hydrated pulses without pre-heating the pulses.

Figure 5:
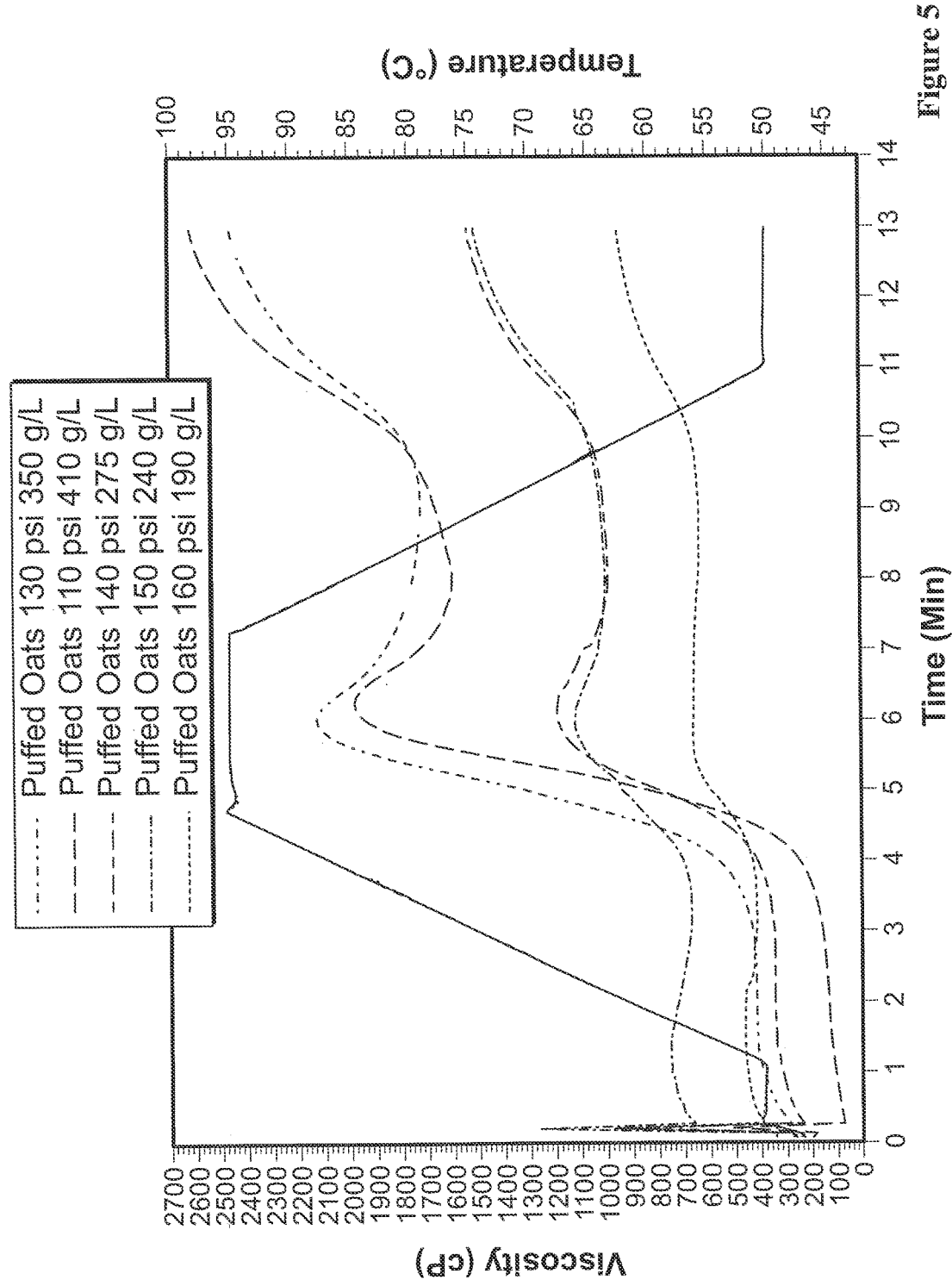
FIG. 5 is a RVA analysis of oats puffed to the target size and density in one aspect of the instant invention

FIG. 5 shows the result of RVA analysis of five (5) different oat samples processed at puffing gun pressures ranging from 110 psig to 160 psig. In this aspect of the instant invention, the RVA curves show that the degree of cook and starch modification are subject to the processing pressure, and therefore the level of starch modification can be controlled. The preferred level of modification for whole oats falls within the range demonstrated by 110-150 psig.

Figure 6:
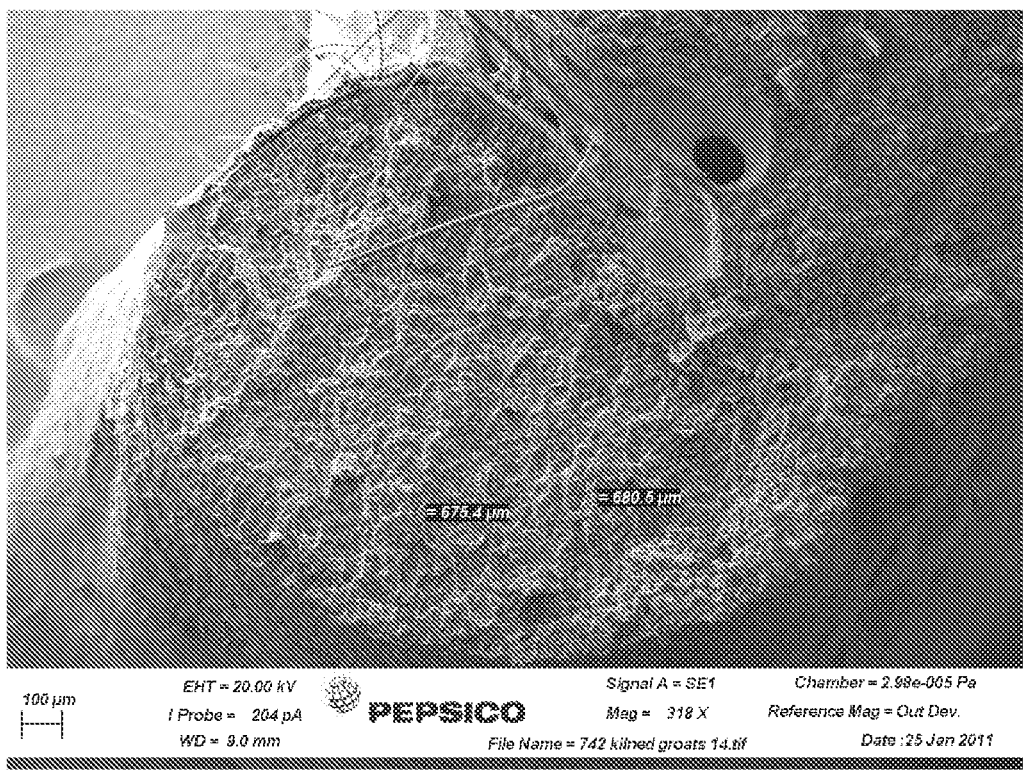
FIG. 6 is an electron micrograph of a cross section of a typical unrtreated oat groat
Figure 7:
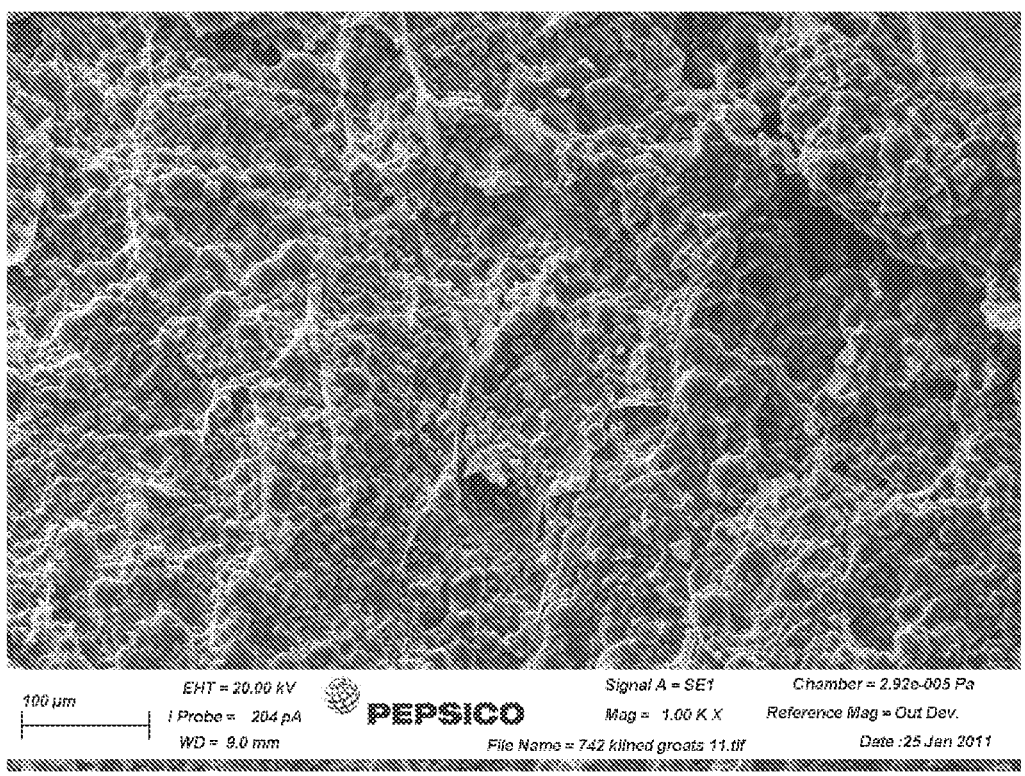
FIG. 7 is an electron micrograph (1000× magnification) of the interior of a typical untreated oat groat.
Figure 8:
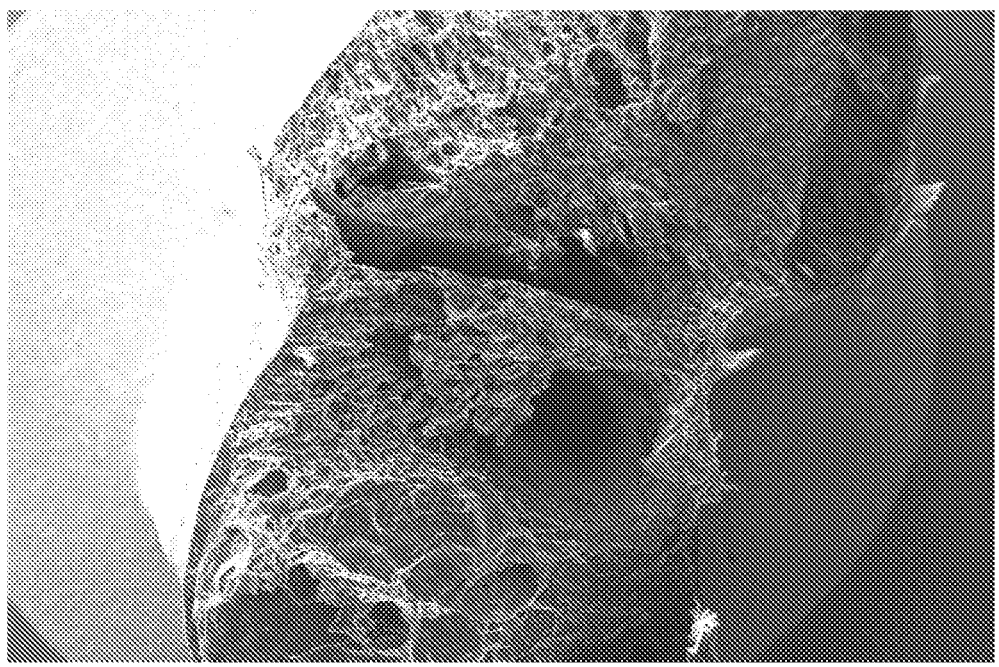
FIG. 8 is an electron micrograph of the cross section of an oat groat puffed to the target size and porosity in one aspect of the instant invention.
Figure 9:
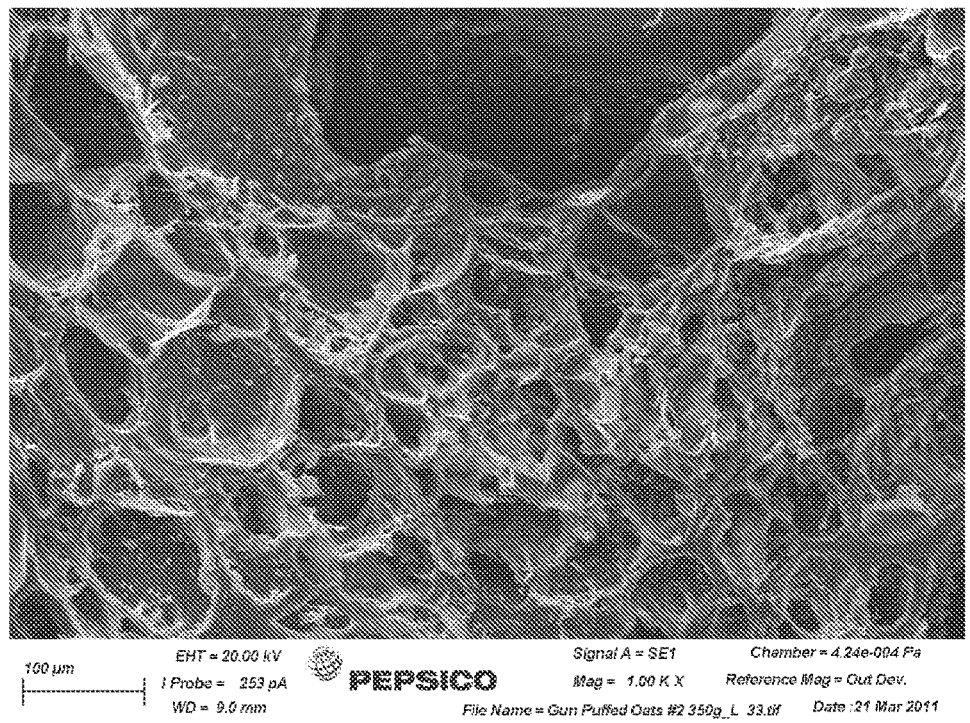
FIG. 9 is an electron micrograph (1000× magnification) of the interior of an oat groat puffed to the target size and porosity in one aspect of the instant invention.
Figure 10:
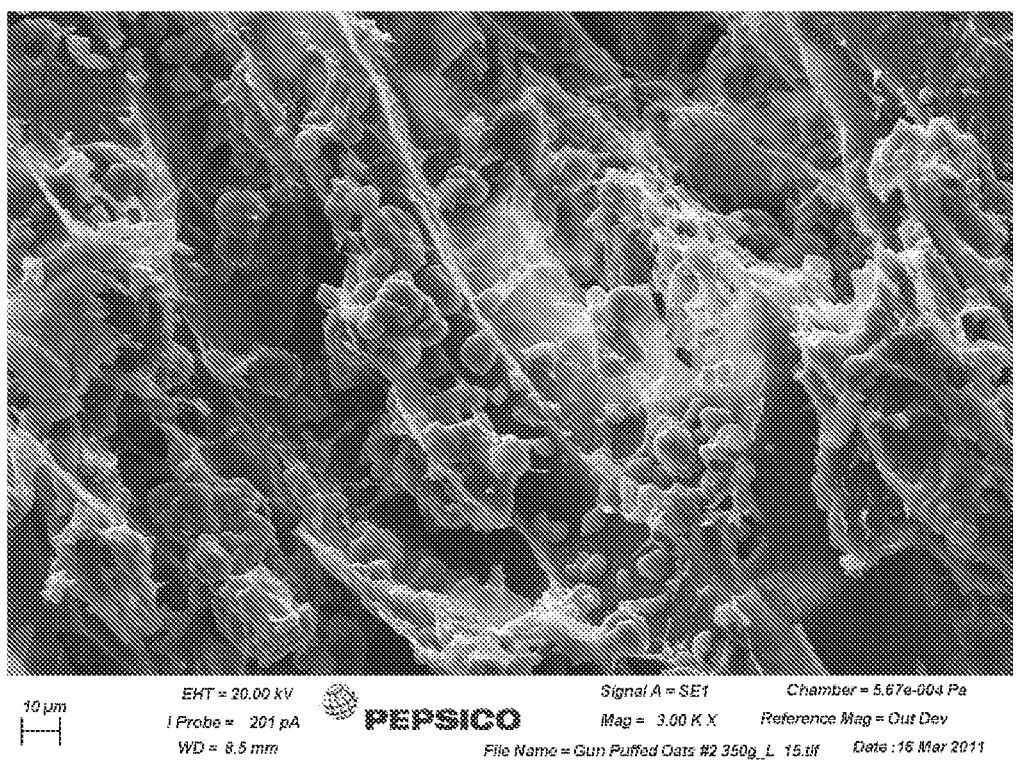
FIG. 10 is an electron micrograph (3000× magnification) of the microstructure of an oat groat puffed to the target size and porosity in one aspect of the instant invention.

FIG. 8 illustrates the porous structure of a puffed oat made in accordance with the present invention compared to the non-porous structure of an oat as shown in FIG. 6. FIG. 9 shows that a large portion of the starch granules have been gelatinized and plated up against the oat cell wall structure, compared to un-gelatinized starch granules within the oat cell walls in FIG. 7. FIGS. 5 and 10 show that some of the starch granules in the lightly puffed oat are not gelatinized and therefore, during subsequent cooking by the consumer to provide a texture more similar to cooked native whole oats.

The following examples further illustrate the present invention.

Various grains were tested using the flat plate compression methods described above. The results below are taken from two trials conducted of the subject matter described in the present application. Tests were conducted using a rice cake popping machine manufactured by LEM Machine Company or Ideal Snacks Company. These grains are identified in the chart below, along with testing parameters and characteristics of the grains following flat plate compression.

| Sample | Uncooked A-Grade Oat | Uncooked Brown Rice | Uncooked Long Grain White Rice | Cooked A-Grade Oat | Cooked Brown Rice |
|---|---|---|---|---|---|
| Initial MC (%) | 9.11 | 10.83 | 12 | 10.83 | 8.40 |
| Pre-Hydration Time (Min.) | 90 | 130 | NA | 170 | 270 |
| Pre-hydrated Moisture (%) | 14.7 | 13.9 | 12 | 13.2 | 12.1 |
| Top Plate Temp. (° C.) | 230 | 210 | 210 | 220 | 210 |
| Bottom Plate Temp. (° C.) | 240 | 220 | 220 | 230 | 220 |
| Hydraulic Pressure (PSI) | 1000 | 1500 | 1500 | 2500 | 2500 |
| Bake Cycle Time (Sec.) | 11 | 9 | 12 | 12 | 8 |

| Sample | Uncooked Navy Bean | Cooked Navy Bean | Cooked Navy Bean | Uncooked Easton Lentil | Cooked Easton Lentil | Cooked Easton Lentil |
|---|---|---|---|---|---|---|
| Initial MC (%) | 11.4 | | | 16.0 | 11.1 | |
| Pre-hydration Time (Min.) | 220 | 150 | 325 | 250 | 295 | 280 |
| Pre-hydrated moisture (%) | 16.5 | 14.0 | 16.0 | 14.7 | 11.7 | 14.6 |
| Top Plate Temp. (° C.) | 220 | 220 | 220 | 220 | 220 | 220 |
| Bottom Plate Temp. (° C.) | 225 | 225 | 225 | 225 | 225 | 225 |
| Air Supply Pressure (PSI) | 85 | 85 | 85 | 85 | 85 | 85 |
| Bake Cycle Time (Sec.) | 4.0 | 4.0 | 5.0 | 5.5 | 4.5 | 4.5 |
| Bake Time (Sec.) | 1.0 | 1.0 | 2.0 | 2.5 | 1.5 | 1.5 |
| Final Moisture (%) | 5.0 | 4.1 | 9.4 | 4.8 | Too sticky | Too sticky |

The grains processed in accordance with the methods of the present invention demonstrated a dramatic decrease in preparation time compared to the grain in its original state, while maintaining the identity of the grain. Pulses processed in accordance with the methods of the present invention demonstrated a dramatic decrease in preparation time compared to raw pulses.

Various grains and pulses were tested using the gun puffing described above. Below are results from various trials performed:

|  | Non-Hydrated Black Kidney Beans | | | | | Hydrated Black Kidney Beans | | | | |
| --- | --- | --- | --- | --- | --- | --- | --- | --- | --- | --- |
| Time in Pre-Heater (s) | 10 | 10 | 10 | 10 | 10 | 10 | 10 | 10 | 10 | 10 |
| Puffing Gun Pressure (PSI) | 100 | 130 | 150 | 170 | 100 | 85 | 130 | 160 | 190 | 80 |
| Barrel Temp. (° F.) | 347 | 347 | 347 | 347 | 347 | 347 | 347 | 347 | 347 | 347 |
| Final Bulk Density (G/2048 cc cup) | 1020-1100 | 700 | 700 | 575 | 860 | 1080 | 680 | 600 | 600 | 1150 |

Hydration procedure: 750 g of water, 15 kg of black kidney beans, equilibrated over night.

|  | Non-Hydrated Rice | | | | Rice Hydrated with Water | | | | Rice Hydrated with Vinegar | | |
| --- | --- | --- | --- | --- | --- | --- | --- | --- | --- | --- | --- |
| Time in Pre-Heater (s) | 20 | 20 | 20 | 20 | 20 | 20 | 20 | 20 | 20 | 20 | 20 |
| Puffing Gun Pressure (PSI) | 108 | 90 | 100 | 98 | 130 | 115 | 95 | 103 | 100 | 135 | 95 |
| Final Bulk Density (G/2048 CC Cup) | 330 | 900 | 500-600 | 800 | 300 | 280-450 | 740-770 | 600 | 600-700 | 300 | 710 |

Hydration with water: 750 g of water into 15 kg of rice, equilibrated over night.
Hydration with vinegar: 800 g of vinegar (5% acetic acid) into 15 kg of rice, equilibrated over night.

|  | Non-Hydrated Kilned A-Grade Oats | | | | Kilned A-Grade Oats Hydrated with Water | | | Kilned A-Grade Oats Hydrated with Vinegar | | | |
| --- | --- | --- | --- | --- | --- | --- | --- | --- | --- | --- | --- |
| Time in Pre-Heater (s) | 20 | 20 | 20 | 20 | 20 | 20 | 20 | 20 | 20 | 20 | 20 |
| Puffing Gun Pressure (PSI) | 140 | 115 | 100 | 170 | 180 | 140 | 110 | 105 | 135 | 150 | 165 |
| Final Bulk Density (G/2048 CC Cup) | 550-600 | 750 | 840 | 400 | 290 | 520 | 700 | 780 | 540 | 400 | 290 |

Hydration with water: 750 g of water into 15 kg of oats, equilibrated over night.
Hydration with vinegar: 800 g of vinegar (5% acetic acid) into 15 kg of oats, equilibrated over night.

|  | Non-Hydrated Green Oats | | | | Green Oats Hydrated with Water | | | Green Oats Hydrated with Vinegar | | | |
| --- | --- | --- | --- | --- | --- | --- | --- | --- | --- | --- | --- |
| Time in Pre-Heater (s) | 20 | 20 | 20 | 20 | 20 | 20 | 20 | 20 | 20 | 20 | 20 |
| Puffing Gun Pressure (PSI) | 150 | 125 | 100 | 90 | 150 | 125 | 100 | 175 | 150 | 125 | 100 |
| Final Bulk Density (G/2048 CC Cup) | 400 | 600 | 720 | 800 | 400 | 600 | 760 | 280 | 400 | 630 | 770 |

Hydration with water: 750 g of water into 15 kg of oats, equilibrated over night.
Hydration with vinegar: 800 g of vinegar (5% acetic acid) into 15 kg of oats, equilibrated over night.

|  | Non-Hydrated Red Kidney Beans | | | | Hydrated Red Kidney Beans | | | | | |
| --- | --- | --- | --- | --- | --- | --- | --- | --- | --- | --- |
| Time in Pre-Heater (s) | 10 | 10 | 10 | 10 | 10 | 10 | 10 | 10 | 10 | 10 |
| Puffing Gun Pressure (PSI) | 100 | 130 | 150 | 170 | 80 | 100 | 80 | 130 | 160 | 115 |
| Puffing Gun Temp. (° F.) | 347 | 348 | 342 | 365 | 372 | 342 | — | — | 360 | 370 | — |
| Final Bulk Density (G/2048 cc cup) | 1020 | 650 | 530 | 580 | 1220 | 810 | 1060 | 580 | 580 | 600 |

Hydration with water: 750 g of water into 15 kg of beans, equilibrated over night.

|  | Non-Hydrated Wheat | | | | Wheat Hydrated with Water | | | Wheat Hydrated with Vinegar | | |
| --- | --- | --- | --- | --- | --- | --- | --- | --- | --- | --- |
| Time in Pre-Heater (s) | 20 | 20 | 20 | 20 | 20 | 20 | 20 | 20 | 20 | 20 |
| Puffing Gun Pressure (PSI) | 125 | 115 | 105 | 95 | 105 | 120 | 100 | 120 | 95 | 135 |
| Final Bulk Density (G/2048 CC Cup) | 300 | 500 | 823 | 820 | 600 | 400 | 600 | 450 | 400 | 430 |

Hydration with water: 750 g of water into 15 kg of wheat, equilibrated over night.
Hydration with vinegar: 800 g of vinegar (5% acetic acid) into 15 kg of wheat, equilibrated over night.

Overall, the grains and pulses of the present invention exhibit about a 2 to 5-fold increase in volume using the processing methods set forth herein.

The specific grains and pulses were subsequently cooked. These cooking parameters and observations are set forth in the tables below.

Red and black kidney beans: In evaluating the sample, each sample was weighed. 1 tablespoon of margarine and water were brought to a boil in a medium saucepan. The sample was stirred in and the heat was turned down to medium and boiled, stirring occasionally, for 15 minutes. The mixture was subsequently reduced to a low temperature, covered and simmered for 15 minutes. Lastly, the mixture was removed from the heat and stood (with lid on for 5 minutes). The texture and flavor were then evaluated. The results of one such test are as follows:

| Sample # | Set #1- 175 g + 710 g water | Sample wt in g | Water wt in g | Cook time in minutes | Simmer time, min. | Rest time in minutes | Comments |
| --- | --- | --- | --- | --- | --- | --- | --- |
| 1 | Unhydrated red kidney bean, 80 psi | 175 | 750 | 15 | 15 | 5 | Excess water, good appearance (large portion of intact full beans), undercooked chalky texture, flavor ok, needed more cook or simmer time |
| 2 | Unhydrated red kidney bean, 100 psi | 175 | 750 | 15 | 15 | 5 | Excess water, good appearance, cooked texture al dente or slightly undercooked, flavor has moderate smoky note, higher percentage of loose seed coat skins separated from the bean |
| 3 | Unhydrated red kidney bean, 130 psi | 175 | 750 | 15 | 15 | 5 | Excess water but more sauce-like due to loss of a large portion of the bean identity, strong smoky or toasted flavor, not good for side dish, may be ok in a soup mix |
| 4 | Unhydrated red kidney bean, 170 psi | 175 | 750 | 15 | 15 | 5 | Excess water but more sauce-like due to loss of a large portion of the bean identity, strongest smoky or toasted flavor, not good for side dish, may be ok in a soup mix for the right flavor system |
| 5 | Water hydrated red kidney bean, 80 psi | 175 | 750 | 15 | 15 | 5 | Excess water, good appearance (large portion of intact full beans), cooked texture ok, maybe al dente to some, flavor good, smoky notes either very slight or none |

-continued

| Sample # | Set #1- 175 g + 710 g water | Sample wt in g | Water wt in g | Cook time in minutes | Simmer time, min. | Rest time in minutes | Comments |
|---|---|---|---|---|---|---|---|
| 6 | Water hydrated red kidney bean, 100 psi | 175 | 750 | 15 | 15 | 5 | Excess water, good appearance but fewer attached seed coats than sample #5, cooked texture ok, flavor has slight smoky flavor |
| 7 | Water hydrated red kidney bean, 130 psi | 175 | 750 | 15 | 15 | 5 | Excess water but more sauce-like due to loss of a large portion of the bean identity, strong smoky or toasted flavor, not good for side dish, may be ok in a soup mix |
| 8 | Water hydrated red kidney bean, 170 psi | 175 | 750 | 15 | 15 | 5 | Excess water but more sauce-like due to loss of a large portion of the bean identity, strongest smoky or toasted flavor, not good for side dish, may be ok in a soup mix for the right flavor system |
| 9 | Unhydrated black bean, 100 psi | 175 | 710 | 15 | 15 | 5 | Excess water, good appearance (large portion of intact full beans), al dente texture |
| 10 | Unhydrated black bean, 130 psi | 175 | 710 | 15 | 15 | 5 | Excess water, fair appearance, soft texture, potentially too soft depending on individual preferences |
| 11 | Unhydrated black bean, 170 psi | 175 | 710 | 15 | 15 | 5 | Excess water but more sauce-like due to loss of a large portion of the bean identity, most toasted flavor, not good for side dish, may be ok in a soup mix |
| 12 | Water hydrated black bean, 100 psi | 175 | 710 | 15 | 15 | 5 | Excess water, good appearance (large portion of intact full beans), al dente texture but softer than sample #9 |
| 13 | Water hydrated black bean, 130 psi | 175 | 710 | 15 | 15 | 5 | Excess water, fair appearance, soft texture, potentially too soft depending on individual preferences |
| 14 | Water hydrated black bean, 170 psi | 175 | 710 | 15 | 15 | 5 | Excess water but more sauce-like due to loss of a large portion of the bean identity, most toasted flavor, not good for side dish, may be ok in a soup mix |

Another set of red and black kidney beans was tested with a slightly adjusted method of preparation. In evaluating the second set of samples, each sample was weighed. The sample, 1 tablespoon of margarine and water were brought to a boil in a medium saucepan. The mixture was subsequently reduced to a low temperature, covered and simmered for the target simmer time. Lastly, the mixture was removed from the heat and stood (with lid on for 2 minutes). The texture and flavor were then evaluated. The results of one such test are as follows:

| Sample # | Set #2- 175 g + 473 g water | Sample wt in g | Water wt in g | Cook time in minutes | Simmer time, min. | Rest time in minutes | Comments |
|---|---|---|---|---|---|---|---|
| 15 | Unhydrated red kidney bean, 80 psi | 175 | 473 | 0 | 20 | 2 | Moderate amount of excess water, very good appearance, (large portion of intact full beans), undercooked texture, flavor ok |
| 16 | Unhydrated red kidney bean, 100 psi | 175 | 473 | 0 | 20 | 2 | Moderate amount of excess water, good appearance, undercooked texture, needed about 10' more of simmer time, flavor ok |
| 17 | Unhydrated red kidney bean, 130 psi | 175 | 473 | 0 | 20 | 2 | Moderate amount of excess water, fair appearance, slightly undercooked and fragmented bean creates more of a mushy texture, flavor is strong smoky |
| 18 | Water hydrated red kidney bean, 80 psi | 175 | 473 | 0 | 20 | 2 | Small amount of excess water, very good appearance, undercooked texture, needed about 10' more of simmer time, flavor ok |
| 19 | Water hydrated red kidney bean, 100 psi | 175 | 473 | 0 | 20 | 2 | Small amount of excess water, good appearance, slightly undercooked texture, needed about 5' more of simmer time, flavor ok |
| 20 | Water hydrated red kidney bean, 130 psi | 175 | 473 | 0 | 20 | 2 | Small amount of excess water, fair appearance, cook texture ok but fragmented bean creates more of a mushy texture, flavor tastes smoky |
| 21 | Unhydrated black bean, 100 psi | 175 | 473 | 0 | 7 | 2 | Excess water, good appearance (large portion of intact full beans), al dente texture, probably better with more cook time |
| 22 | Unhydrated black bean, 130 psi | 175 | 473 | 0 | 7 | 2 | Excess water, fair appearance, soft texture, potentially too soft depending on individual preferences |
| 23 | Unhydrated black bean, 170 psi | 175 | 473 | 0 | 7 | 2 | Excess water but more sauce-like due to loss of a large portion of the bean identity, most toasted flavor, not good for side dish, may be ok in a soup mix |
| 24 | Water hydrated black bean, 100 psi | 175 | 473 | 0 | 7 | 2 | Excess water, good appearance (large portion of intact full beans), al dente texture but softer than sample #21, best |

| Sample # | Set #2-<br>175 g +<br>473 g water | Sample wt in g | Water wt in g | Cook time in minutes | Simmer time, min. | Rest time in minutes | Comments |
|---|---|---|---|---|---|---|---|
| 25 | Water hydrated black bean, 130 psi | 175 | 473 | 0 | 7 | 2 | texture and appearance of samples #24-26 Excess water, fair appearance, soft texture, potentially too soft depending on individual preferences |
| 26 | Water hydrated black bean, 170 psi | 175 | 473 | 0 | 7 | 2 | Excess water but more sauce-like due to loss of a large portion of the bean identity, most toasted flavor, not good for side dish, may be ok in a soup mix |

With respect to the rice samples prepared via gun puffing in accordance with this invention, the samples were subsequently evaluated by the following cooking procedures: the target amount of rice was weighed and then added to sauce pan along with a pre-measured amount of water. The mixture was heated to a boil, reduced to low heat, covered with a lid and simmered for a target cook time (as shown in the tables below). The mixture was subsequently removed from the heat and stood (with the lid on the pan) for a target rest time (as shown in the tables below). Lastly, the samples were evaluated for texture and flavor. The results of one such test are as follows:

| Sample # | Set #1-<br>100 g +<br>180 g water | Density g/L | Sample wt in g | Water wt in g | Cook time in minutes | Rest time in minutes | Comments |
|---|---|---|---|---|---|---|---|
| 27 | Unhydrated brown rice, 98 psi, 800 g/2 L | 400 | 100 | 180 | 5 | 3 | two different textures, one that is soft and almost mushy and a second of al dente due to non-uniformity of density within sample, bland but maybe slight toasted note |
| 28 | Water hydrated brown rice, 95 psi, 740 g/2 L | 370 | 100 | 180 | 5 | 3 | same texture as #27, bland but maybe slight toasted note |
| 29 | Vinegar hydrated brown rice 95 psi, 710 g/2 L | 355 | 100 | 180 | 5 | 3 | same texture as #27, different flavor than #27 & #28, very slight sour note, less toast notes |

With respect to the oat samples prepared via gun puffing in accordance with one aspect of this invention, the oats were cooked and tested in a similar manner compared to the rice described above. The results of one such test are as follows:

| Sample # | | Density g/L | Sample wt in g | Water wt in g | Cook time in minutes | Rest time in minutes | Comments |
|---|---|---|---|---|---|---|---|
| | Set #1-<br>100 g +<br>400 g<br>water | | | | | | |
| 30 | Kiln oat unhydrated 140 psi, | 288 | 100 | 400 | 15 | 3 | very little loose water; soft, mushy, porridge like, with individual whole |

-continued

| Sample # | | Density g/L | Sample wt in g | Water wt in g | Cook time in minutes | Rest time in minutes | Comments |
|---|---|---|---|---|---|---|---|
| | 550-600 g/ 2 L | | | | | | kernels still visible, strong toasted flavor, breaks down with stirring |
| 31 | Kiln oat water hydrated 140 psi, 520 g/2 L | 260 | 100 | 400 | 15 | 3 | very little loose water; soft, mushy, porridge like, with individual whole kernels still visible, strong toasted flavor, breaks down with stirring |
| 32 | Kiln oat vinegar hydrated 135 psi, 540 g/2 L | 270 | 100 | 400 | 15 | 3 | very little loose water; soft, mushy, porridge like, with individual whole kernels still visible, less toasted flavor and also has a mild sour taste, |
| | Set #2- 100 g + 350 g water | | | | | | |
| 33 | Kiln oat vinegar hydrated 105 psi, 780 g/2 L | 390 | 100 | 350 | 15 | 3 | small amount of loose water; pasta al dente texture, no hard centers, sour taste, lightest kiln oat color, lightest toasted flavor of sample #s 33-35 |
| 34 | Kiln oat water hydrated 110 psi, 700 g/2 L | 350 | 100 | 350 | 15 | 3 | small amount of loose water; pasta al dente texture, no hard centers, moderate toasted flavor |
| 35 | Kiln oat unhydrated 115 psi, 750 g/2 L | 375 | 100 | 350 | 15 | 3 | small amount of loose water; pasta al dente texture, no hard centers, darkest color of sample #s 33-35, moderate toasted flavor but stronger than sample #s 33 and 34 |

With respect to the wheat samples prepared via gun puffing in accordance with this invention, the wheat were cooked and tested in a similar manner compared to the rice described above. The results of one such test are as follows:

| Sample # | | Sample wt in g | Water wt in g | Cook time in minutes | Rest time in minutes | Comments |
|---|---|---|---|---|---|---|
| | Set #1- 100 g + 350 g water | | | | | |
| 36 | Unhydrated wheat, 115 psi, 500 g/2 L | 100 | 350 | 12 | 3 | chewy and undercooked, too al dente, noticeable toasted flavor, darker color that samples #37 & 38 |
| 37 | Water hydrated wheat, 105 psi, 600 g/2 L | 100 | 350 | 12 | 3 | al dente, and slightly undercooked, bran noticeable but not offensive, mild to no toasted flavor |
| 38 | Vinegar hydrated wheat, 105 psi, 600 g/2 L | 100 | 350 | 12 | 3 | al dente, and slightly undercooked, bran noticeable but not offensive, mild to no toasted flavor, grain by itself is not sour but with excess water is sour |
| | Set #2- 100 g + 250 g water | | | | | |
| 39 | Unhydrated wheat, 105 psi, 820 g/2 L | 100 | 250 | 15.5 | 5 | undercooked |

-continued

| Sample # | | Sample wt in g | Water wt in g | Cook time in minutes | Rest time in minutes | Comments |
|---|---|---|---|---|---|---|
| 40 | Water hydrated wheat, 95 psi, 820 g/2 L | 100 | 250 | 15.5 | 5 | undercooked, but softer than 39 |
| 41 | Vinegar hydrated wheat, 95 psi, 900 g/2 L | 100 | 250 | 15.5 | 5 | undercooked, but softer than #39 |
| 39a | Unhydrated wheat, 105 psi, 820 g/2 L, cooked sample #39 with additional cook and rest time added | 100 | 250 | 5 | 3 | chewy and undercooked, too al dente, noticeable toasted flavor, darker color than #40a & 41a |
| 40a | Water hydrated wheat, 95 psi, 820 g/2 L, cooked sample #40 with additional cook and rest time added | 100 | 250 | 5 | 3 | chewy and undercooked but softer than #39a, bran noticeable but not offensive, mild to no toasted flavor |
| 41a | Vinegar hydrated wheat, 95 psi, 900 g/2 L, cooked sample #41 with additional cook and rest time added | 100 | 250 | 5 | 3 | chewy and undercooked but softer than #39a, bran noticeable but not offensive, mild to no toasted flavor, excess water is sour |

With respect to green oat samples prepared via gun puffing in accordance with one aspect of the instant invention, the green oats were cooked and tested in a similar manner compared to the rice described above. The results of one such test are as follows:

| Sample # | | Sample wt in g | Water wt in g | Cook time in minutes | Rest time in minutes | Comments |
|---|---|---|---|---|---|---|
| | Set #1- 100 g + 400 g water | | | | | |
| 42 | Green oat unhydrated 125 psi, 600 g/2 L | 100 | 400 | 15 | 3 | soft but pasta al dente type texture, with individual kernels still visible, moderate toasted flavor |
| 43 | Green oat vinegar hydrated 125 psi, 630 g/2 L | 100 | 400 | 15 | 3 | soft but pasta al dente type texture, with individual kernels still visible, moderate toasted flavor along with sour flavor |
| | Set #2- 100 g + 350 g water | | | | | |
| 44 | Green oat vinegar hydrated 100 psi, 770 g/2 L | 100 | 350 | 15 | 3 | al dente texture, hulls noticeable, sour taste, low toast flavor |
| 45 | Green oat unhydrated 90 psi, 800 g/2 L | 100 | 350 | 15 | 3 | most chewy, hulls noticeable, potentially could have used a long cook time, low toast flavor, less toasted flavor than samples #33-35 |

Further, the grains and pulses made in accordance with aspects of this invention may be used in other types of products where the product developer needs to control the density and texture of the components. For example, these grains or pulses could also be used by product developers to make unique agglomerated products such as snack bars. Grains and pulses made in accordance with aspects of the present invention can also be used as a component in a multi-component snack mix.

It was found that using low temperatures and pressures along with the extremely rapid/instantaneous depressurization utilized in the gun puffing and flat plate compression methods described herein provided unexpected results—grains and pulses with low to moderately increased porosity, preferred bulk densities and optimal rehydration properties while retaining the original identity/appearance of the grain or legume.

This invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

The invention claimed is:

1. A method of processing whole pulses comprising porosity, said method controlling the porosity of the whole pulses to produce quick-cook pulses, the method comprising the steps of:
   - dehulling whole pulses;
   - pre-hydrating and tempering the whole pulses for 1 to 12 hours until the whole pulses have a moisture content of about 13-25%, wherein the whole pulses have a bulk density of about 800 g/L;
   - preheating the pulses to bring the temperature of the whole pulses from about 38° C. to about 120° C. prior to introducing the pulses into a gun puffing chamber;
   - introducing the whole pulses into the gun puffing chamber and sealing the chamber;
   - raising a pressure of the chamber to about 80-175 psig at a temperature of about 162-192° C. until the moisture within the whole pulses reaches a moisture content of about 14-30%;
   - instantaneously reducing the pressure to atmospheric pressure in less than about 2 seconds to create a puffed whole pulses with a reduced bulk density to between 260-700 g/L; and
   - dehydrating the whole pulses until the moisture content within the quick-cook pulses reaches below about 14% and an aw less than about 0.65.

2. The method of claim 1 wherein the moisture content of the whole pulses following dehydration is about 10-13%.

3. The method of claim 1 wherein the moisture content of the whole pulses following dehydration is about 3-5%.

4. The method of claim 1 wherein the dehydrating step comprises drying with hot air in a batch or continuous bed dryer or dried in a fluid bed hot air dryer to reach the final moisture.

5. The method of claim 1 wherein a volume of the whole pulses increases by about 2 to 5 fold during the processing steps.

6. A method of processing split pulses comprising a porosity, the method controlling the porosity of the split pulses, the method comprising steps of:
   - pre-hydrating and tempering the split pulses for 1 to 12 hours until the split pulses have a moisture content of about 13-25%, wherein the split pulses have a bulk density of about 800 g/L;
   - preheating the split pulses to bring the temperature of the split pulses from about 38° C. to about 120° C. prior to introducing the split pulses into a gun puffing chamber;
   - introducing the split pulses into the gun puffing chamber and sealing the chamber;
   - raising a pressure of the chamber to about 80-175 psig at a temperature of about 162-192° C. until the moisture within the split pulses reaches a moisture content of about 14-30%;
   - instantaneously reducing the pressure to atmospheric pressure in less than about 2 seconds to create a puffed split pulses with a reduced bulk density to between 260-700 g/L; and
   - dehydrating the split pulses until the moisture content within the split pulses reaches below about 14% and an aw less than about 0.65.

7. The method of claim 6 wherein the moisture content of the split pulses following dehydration is about 10-13%.

8. The method of claim 6 wherein the moisture content of the split pulses following dehydration is about 3-5%.

9. The method of claim 6 wherein the dehydrating step comprises drying with hot air in a batch or continuous bed dryer or dried in a fluid bed hot air dryer to reach the final moisture.

10. The method of claim 1 wherein a volume of the split pulses increases by about 2 to 5 fold during the processing steps.

* * * * *